United States Patent
Klingbeil (10) Patent No.: US 10,408,158 B2
(45) Date of Patent: Sep. 10, 2019

(54) DIFFERENTIAL CYLINDER BALANCING FOR INTERNAL COMBUSTION ENGINE

(71) Applicant: GENERAL ELECTRIC COMPANY, Schenectady, NY (US)

(72) Inventor: Adam Edgar Klingbeil, Ballston Lake, NY (US)

(73) Assignee: GE Global Sourcing LLC, Norwalk, CT (US)

( * ) Notice: Subject to any disclaimer, the term of this patent is extended or adjusted under 35 U.S.C. 154(b) by 161 days.

(21) Appl. No.: 15/282,094

(22) Filed: Sep. 30, 2016

(65) Prior Publication Data

US 2018/0094600 A1 Apr. 5, 2018

(51) Int. Cl.

| F02D 41/40 | (2006.01) |
| F02D 19/08 | (2006.01) |
| F02D 19/06 | (2006.01) |
| F02D 41/22 | (2006.01) |
| F02D 41/00 | (2006.01) |

(Continued)

(52) U.S. Cl.
CPC ....... F02D 41/402 (2013.01); F02D 19/0642 (2013.01); F02D 19/08 (2013.01); F02D 41/0025 (2013.01); F02D 41/0027 (2013.01); F02D 41/0085 (2013.01); F02D 41/1446 (2013.01); F02D 41/222 (2013.01); F02D 41/34 (2013.01); F02D 2041/389 (2013.01); Y02T 10/36 (2013.01); Y02T 10/44 (2013.01)

(58) Field of Classification Search
CPC .... F02D 41/402; F02D 19/0642; F02D 19/08; F02D 41/0027; F02D 41/0085; F02D 41/222; F02D 2041/289; F02D 2200/023

USPC ........................................................ 123/299
See application file for complete search history.

(56) References Cited

U.S. PATENT DOCUMENTS 4,641,625 A * 2/1987 Smith ................. F02D 19/0628
                                                        123/27 GE
5,355,854 A * 10/1994 Aubee ..................... F02B 43/00
                                                        123/27 GE (Continued)

FOREIGN PATENT DOCUMENTS

| JP | 10110640 A | 4/1998 |
| JP | 4616851 B2 | 1/2011 |

OTHER PUBLICATIONS

J. Hyvonen et al., "Balancing cylinder-to-cylinder variations in a Multi-Cylinder VCR-HCCI engine", Society of Automotive Engineers technical paper series, Jun. 8-10, 2004.

(Continued)

*Primary Examiner* — John M Zaleskas
*Assistant Examiner* — Susan E Scharpf
(74) *Attorney, Agent, or Firm* — McCoy Russell LLP (57) ABSTRACT

A method of adjusting operation of an internal combustion engine includes injecting fuel into cylinders of the internal combustion engine (first fuel operation); obtaining a first fuel exhaust temperature profile during the first fuel operation; injecting two fuels into the cylinders in a dual fuel operation; obtaining a dual fuel exhaust temperature profile; and adjusting the injection quantity and/or an injection timing of one fuel in a cylinder(s), based on a difference between the first fuel exhaust temperature profile and the dual fuel exhaust temperature profile. Other methods of operating with single fuel and using sensors other than exhaust temperature sensors are disclosed.

15 Claims, 5 Drawing Sheets

(51) Int. Cl.
  *F02D 41/14* (2006.01)
  *F02D 41/34* (2006.01)
  *F02D 41/38* (2006.01)

(56) References Cited

U.S. PATENT DOCUMENTS

| | | | | |
|---|---|---|---|---|
| 5,370,097 A | * | 12/1994 | Davis | F02D 19/0631 123/27 GE |
| 5,541,840 A | * | 7/1996 | Gurne | B60T 8/885 701/29.3 |
| 6,000,384 A | * | 12/1999 | Brown | F02D 19/0631 123/436 |
| 6,003,478 A | * | 12/1999 | Huber | F02B 7/06 123/27 GE |
| 6,101,986 A | * | 8/2000 | Brown | F02D 19/0628 123/27 GE |
| 6,158,418 A | * | 12/2000 | Brown | F02D 19/0631 123/435 |
| 6,230,683 B1 | * | 5/2001 | zur Loye | F02B 1/12 123/27 GE |
| 6,250,260 B1 | * | 6/2001 | Green | F02B 3/06 123/27 GE |
| 6,276,334 B1 | * | 8/2001 | Flynn | F02B 19/14 123/435 |
| 6,286,482 B1 | * | 9/2001 | Flynn | F02B 1/12 123/25 C |
| 6,289,871 B1 | * | 9/2001 | Brown | F02D 19/0628 123/299 |
| 6,543,395 B2 | * | 4/2003 | Green | F02B 3/06 123/27 GE |
| 6,981,488 B2 | | 1/2006 | Harris et al. | |
| 7,591,258 B2 | | 9/2009 | Nagel et al. | |
| 7,751,955 B2 | * | 7/2010 | Chinnadurai | G05B 23/0235 701/29.3 |
| 7,957,889 B2 | | 6/2011 | Portin et al. | |
| 8,826,884 B2 | | 9/2014 | Kang et al. | |
| 2002/0007816 A1 | * | 1/2002 | Zur Loye | F02B 1/04 123/295 |
| 2015/0233282 A1 | * | 8/2015 | Bandyopadhyay | F02B 37/00 60/603 |

OTHER PUBLICATIONS

K. Suzuki et al., "Individual A/F Control with Fuel-Gas Ratio Estimation for Multi-cylinder IC Engines", Proceedings of the 2007 American Control Conference, pp. 5094-5099, Jul. 11-13, 2007.

* cited by examiner

DIFFERENTIAL CYLINDER BALANCING FOR INTERNAL COMBUSTION ENGINE

BACKGROUND OF THE INVENTION

The present invention relates generally to internal combustion engines and more particularly to improved methods of cylinder balancing in an internal combustion engine.

Imbalance of fuel delivery quantities to cylinders in multi-cylinder engines can lead to an imbalance of power in cylinders. This variation from cylinder-to-cylinder of fuel quantity delivery may cause one, or more, cylinders to approach the knock limits of the fuel-air mixture, which ultimately can lead to performance degradation of the engine.

Spark-ignited and dual fuel internal combustion engines commonly balance cylinders via a controller collecting the measuring of the exhaust temperature of each cylinder and then adjusting an engine parameter, typically fuel quantity, spark timing or injection timing, in order to rebalance the cylinders so that the resultant cylinder exhaust temperatures more closely match each other. While this is a plausible methodology, cylinder-to-cylinder exhaust temperatures are not necessarily indicative of cylinder condition and may provide an inaccurate indication of actual cylinder conditions due to variations in (but not limited to): sensor response, sensor mounting, cylinder breathing, and the like.

Accordingly, there is an ongoing need for improving internal combustion engine operation through improved cylinder balancing.

BRIEF DESCRIPTION

The present invention overcomes at least some of the aforementioned drawbacks by providing an improve cylinder balancing methodology for operating an internal combustion engine. More specifically, the present invention includes a method of cylinder balancing that more accurately accounts for actual cylinder-to-cylinder variations in operating a multi-cylinder internal combustion engine such as a dual fuel engine by considering an engine cylinder parameter, such as cylinder exhaust temperature, in a more accurate way.

Therefore, in accordance with one aspect of the invention, a method of adjusting operation of an internal combustion engine, the method comprises: injecting a first fuel into a plurality of cylinders of the internal combustion engine, thereby defining a first fuel operation; obtaining a first fuel exhaust temperature profile, during the first fuel operation; injecting a second fuel and the first fuel into the plurality of cylinders of the internal combustion engine, thereby defining a dual fuel operation; obtaining a dual fuel exhaust temperature profile, during the dual fuel operation; and adjusting one of an injection quantity and an injection timing of one of the first fuel and the second fuel in at least one of the plurality of cylinders, based on a difference between the first fuel exhaust temperature profile and the dual fuel exhaust temperature profile.

In accordance with another aspect of the invention, a method of adjusting operating an internal combustion engine comprises: injecting a fuel into a plurality of cylinders of an internal combustion engine, defining a baseline operation; obtaining a baseline exhaust temperature profile, during the baseline operation; injecting the fuel into the plurality of cylinders; obtaining a second exhaust temperature profile; and adjusting one of an injection quantity and a spark timing of the fuel in at least one of the plurality of cylinders, based on a difference between the baseline exhaust temperature profile and the second exhaust temperature profile.

In accordance with another aspect of the invention, a method of adjusting operation of an internal combustion engine, the method comprises: injecting a first fuel into a plurality of cylinders of the internal combustion engine, thereby defining a first fuel operation; obtaining a first fuel engine operating profile, during the first fuel operation; injecting a second fuel and the first fuel into the plurality of cylinders of the internal combustion engine, thereby defining a dual fuel operation; obtaining a dual fuel engine operating profile, during the dual fuel operation; and adjusting one of an injection quantity and an injection timing of one of the first fuel and the second fuel in at least one of the plurality of cylinders, based on a difference between the first fuel engine operating profile and the dual fuel engine operating profile.

In accordance with another aspect of the invention, a method of operating an internal combustion engine comprises: injecting a fuel into a plurality of cylinders of an internal combustion engine, defining a baseline operation; obtaining a baseline engine operating profile, during the baseline operation; injecting the fuel into the plurality of cylinders defining an operating condition other than the baseline operating condition; obtaining a second engine operating profile; and adjusting one of an injection quantity and a spark timing of the fuel in at least one of the plurality of cylinders, based on a difference between the baseline engine operating profile and the second engine operating profile.

Various other features and advantages of the present invention will be made apparent from the following detailed description and the drawings.

BRIEF DESCRIPTION OF THE DRAWINGS

The drawings illustrate one embodiment presently contemplated for carrying out the invention.

DETAILED DESCRIPTION

Aspects of the present invention have been shown to offer advantages over previous methodologies of cylinder balancing of multi-cylinder engine. In an embodiment, the method more closely matches the dual fuel exhaust temperature distribution to the diesel-only exhaust temperature distribution. In this manner, a more desirable fueling profile and the concomitant more balanced power profile can be achieved. Ultimately, the operation of the engine is improved.

The term "exhaust temperature profile" as used herein means the enumerated differences between exhaust temperature measured at one (or more) cylinder and an average, or mean, of two or more exhaust temperatures measured from the internal combustion engine, whether at a plurality of individual cylinders; at a common exhaust plenum and one or more cylinders; or, some combination thereof.

The term "engine operating profile" as used herein means the enumerated differences between a measured engine operating parameter at one (or more) cylinder and an average, or mean, of two or more engine operating parameters measured from the internal combustion engine, whether at a plurality of individual cylinders; at a common location and one or more cylinders; or, some combination thereof. The engine operating parameters include, but are not limited to, exhaust temperature, vibration, strain, gas pressure, and the like.

Figure 1:
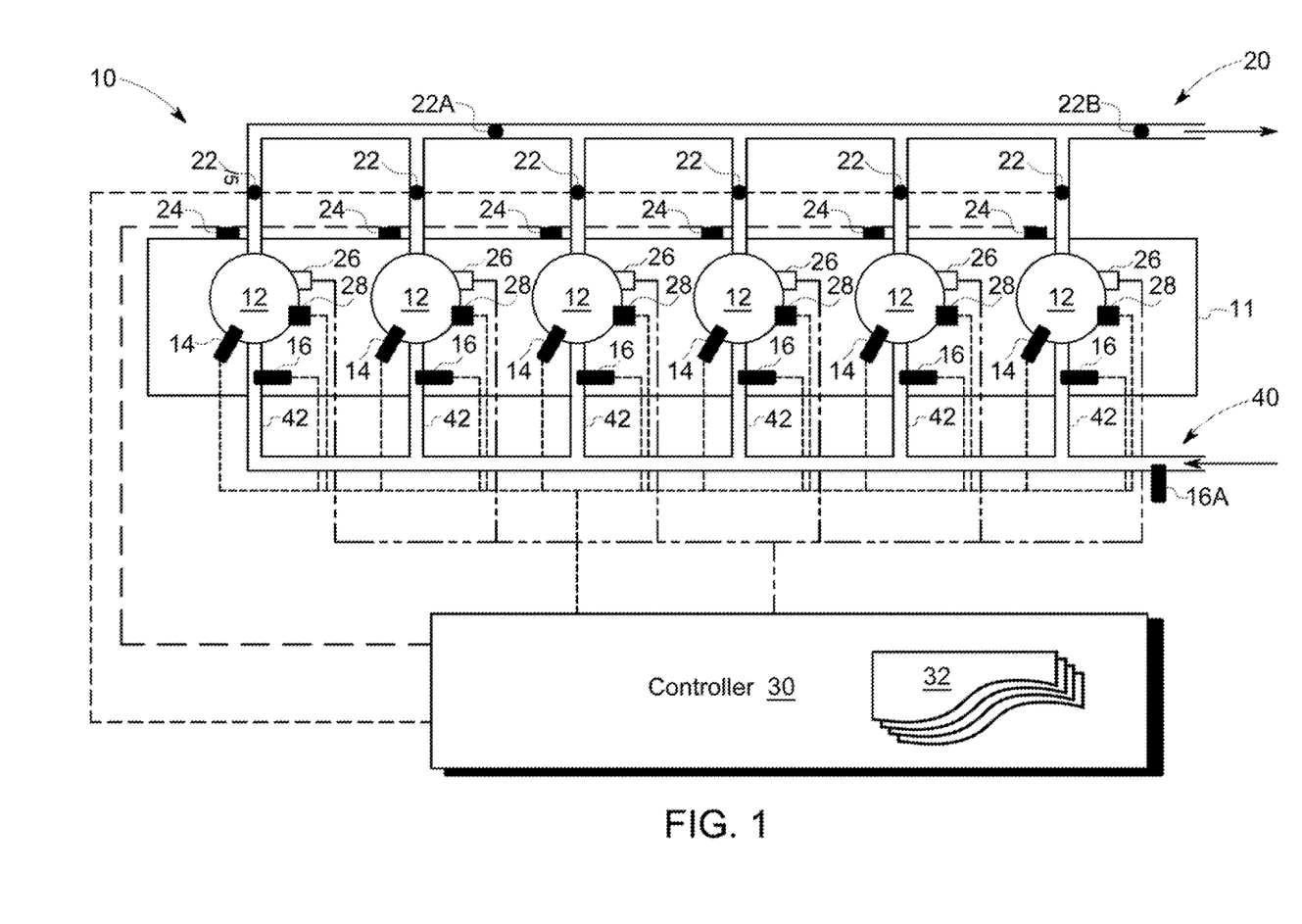
FIG. 1 is a schematic diagram of a multi-cylinder internal combustion engine incorporating aspects of the present invention.

Referring to FIG. 1, a schematic view of a portion of an exemplary multi-cylinder internal combustion engine 10 that can incorporate aspects of the present invention is shown. Salient aspects of the engine 10 are shown. The multi-cylinder internal combustion engine, or engine, 10 may comprise a plurality of cylinders 12. The engine 10 has a dual fuel configuration such that it is configured to run on more than one fuel, such as diesel and natural gas. Other fuels may be used in certain embodiments. Similarly, the engine 10 may be configured to also run on a single fuel.

As shown, the engine 10 having multiple cylinders 12 also comprises a plurality of fuel injectors 14, 16 for each cylinder 12. As is typical for a dual fuel engine 10, each type of fuel may have its own set of fuel injectors. So too here, a first set of fuel injectors 14 provide to each cylinder 12 a first fuel (e.g., diesel). A second set of fuel injectors 16 provide to each cylinder 12 a second fuel (e.g., natural gas). The engine 10 has an intake manifold 40 configured to deliver air to each of the cylinders 12 via intake ports 42. As shown, each intake port, or plenum 42 for each cylinder 12 may have an associated fuel injector 16 for delivering, or injecting, the second fuel into the cylinder 12.

Although the embodiment shown in FIG. 1 discloses a specific configuration of fuel injectors, other configurations are possible under embodiments of the invention. For example, the locations of the fuel injectors 14, 16 shown are merely schematic. The fuel injectors 14, 16 could be located in other locations. For example, both fuel injectors 14, 16 can be located in the combustion chamber in an embodiment. Similarly, in single fuel embodiments the fuel injectors may be located in the combustion chamber, the intake port, or plenum, and the like. For example, in an embodiment the fuel injector 16A may be located upstream in the intake plenum and/or at a carburetor (not shown) in the intake system 40. Similarly, in an embodiment, instead of a two injector (e.g., 14, 16) configuration, there is a spark igniter at the cylinder (not shown) and a single point (or more) injector 16A that is in the intake system 40. This configuration can be used, for example, when natural gas is used as the single fuel.

The engine 10 has an exhaust system 20 that comprises a plurality exhaust ports, or plenums, that typically manifold together the exhaust gasses from the respective cylinders 12. Each cylinder 12 has an exhaust temperature sensor 22. The exact location and mounting configuration of the exhaust temperature sensor 22 may vary depending on the type of sensor used, the type of engine, the mounting configuration, and the like.

Although the embodiment shown in FIG. 1 discloses a specific configuration of exhaust temperature sensors 22, other configurations are possible under embodiments of the invention. For example, the locations of the exhaust temperature sensors 22 shown are merely schematic. Additionally, in addition to and/or in lieu of the locating of exhaust temperature sensors 22 along the individual cylinder exhaust ports or plenums, an exhaust temperature sensor(s) may be located on the exhaust manifold/plenum (see e.g., 22B). Similarly, in other embodiments, there may be a fewer quantity of exhaust temperature sensors 22 than the quantity of cylinders 12. For example, an individual exhaust temperature sensor may be sharing two (or more) cylinders in measuring exhaust temperature (See e.g., 22A). For example, in a V-configured engine (not shown) there may be a single exhaust temperature sensor that measures exhaust temperature from opposing cylinders from opposing cylinder banks.

The engine 10 may also have knock sensors 24, pressure sensors 26, and stress/strain gage 28 associated with each of the cylinders 12. As shown in FIG. 1, each knock sensor 24 may be attached to the engine block 11 adjacent to a respective cylinder 12. The knock sensor 24 is configured to measure vibration. Similarly, each pressure sensors 26 may be in fluid communication with a respective cylinder 12. The pressure sensor 26 is configured to measure gas pressure in the cylinder 12 chamber. Similarly, each stress/strain gage 28 may be suitably located so as to measure strain. These sensors may be used in addition to and/or in lieu of exhaust temperature sensors in the balancing of the cylinders. For example, the other sensor(s) (e.g., 24, 26, etc.) can be used to obtain engine operating profiles of the cylinders other than the exhaust temperature profiles. The various methods herein can optionally use the engine operating profiles in determining cylinder and engine operating conditions. It should be apparent that this balancing technique can be applied to balance the cylinders using other sensors besides exhaust temperature, knock, pressure or strain sensors.

The engine 10 comprises a controller 30 that is in communication with the fuel system (partially shown), the plurality of fuel injectors 14, 16 and temperature sensors 22. The controller 30 may also be in communication with the knock sensors 24, pressure sensors 26, and stress/strain gages 28. The controller 30 may store one, or more, exhaust temperature profiles 32 therein. The controller 30 may also store one, or more, of the other operating profiles therein. Alternatively, exhaust temperature profile(s) 32 and the other engine operating profiles may be stored remotely from engine 10 (e.g., internet, cloud, remote storage, etc.).

Figure 2:
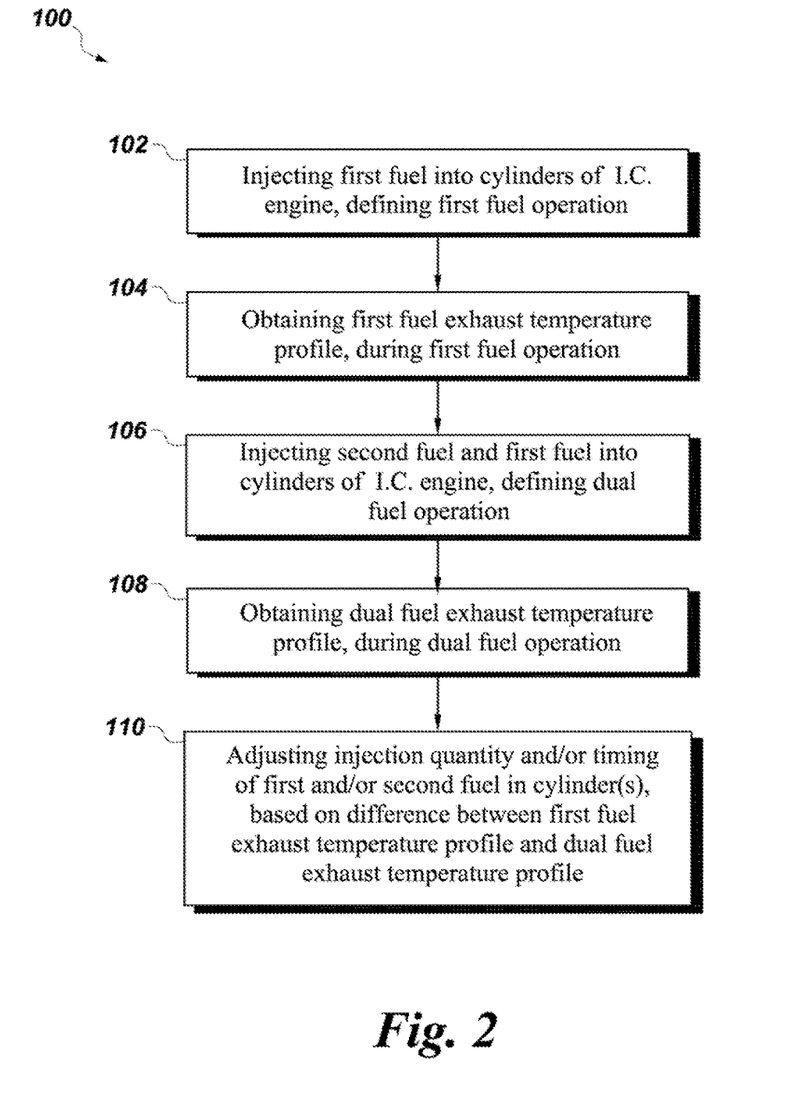
FIG. 2 is a flowchart depicting a method of adjusting operation of an internal combustion engine, according to an embodiment of the present invention.

Referring to FIG. 2, a flowchart of a method of operating the engine 10 is depicted. As shown, a method 100 may comprise injecting a first fuel into a plurality of cylinders of the internal combustion engine, thereby defining a first fuel operation at 102. At 104, the method 100 continues with obtaining a first fuel exhaust temperature profile, during the first fuel operation. At 106, the method 100 injects the second fuel and the first fuel into the cylinders of the engine 10, thereby defining a dual fuel operation. The method 100 then obtains a dual fuel exhaust temperature profile during the dual fuel operation at 108. At 110, the method 100 adjusts the fuel injection quantity and/or injection timing of the first fuel and/or the second fuel in one, or more, cylinder based on the difference between the first fuel exhaust temperature profile and the dual fuel exhaust temperature profile.

An embodiment of a method of operating the engine comprises calculating the baseline exhaust temperature distribution of all cylinders while operating only under diesel. The distribution is shown in Equation 1:

$$T\_avg,diesel = average(T\_Cyl) \qquad (Eq. 1)$$

The method continues with calculating the baseline, BL, (e.g., diesel only) temperature differential, ΔT, shown in Equation 2:

$$\Delta T\_Cyl\_BL = T\_Cyl - T\_\text{avg,diesel} \quad \text{(Eq. 2)}$$

The method then calculates the temperature differential, ΔT, of the cylinders while operating under a dual fuel mode, as shown in Equation 3:

$$\Delta T\_Cyl = T\_Cyl - T\_\text{avg} \quad \text{(Eq. 3)}$$

The method then balances the cylinders by adjusting the fueling (e.g., injection quantity and/or injection timing) to the cylinders so that Equation 4 is met.

$$\Delta T\_Cyl = \Delta T\_Cyl\_BL \quad \text{(Eq. 4)}$$

In this manner, the exhaust temperatures will not necessarily be balanced across all cylinders, but instead the temperature distribution across the cylinders will vary from the mean temperature in dual fuel mode in the same way as it does for diesel operation and will be shifted higher or lower according to how the engine operating condition impacts the mean temperature.

Figure 3:
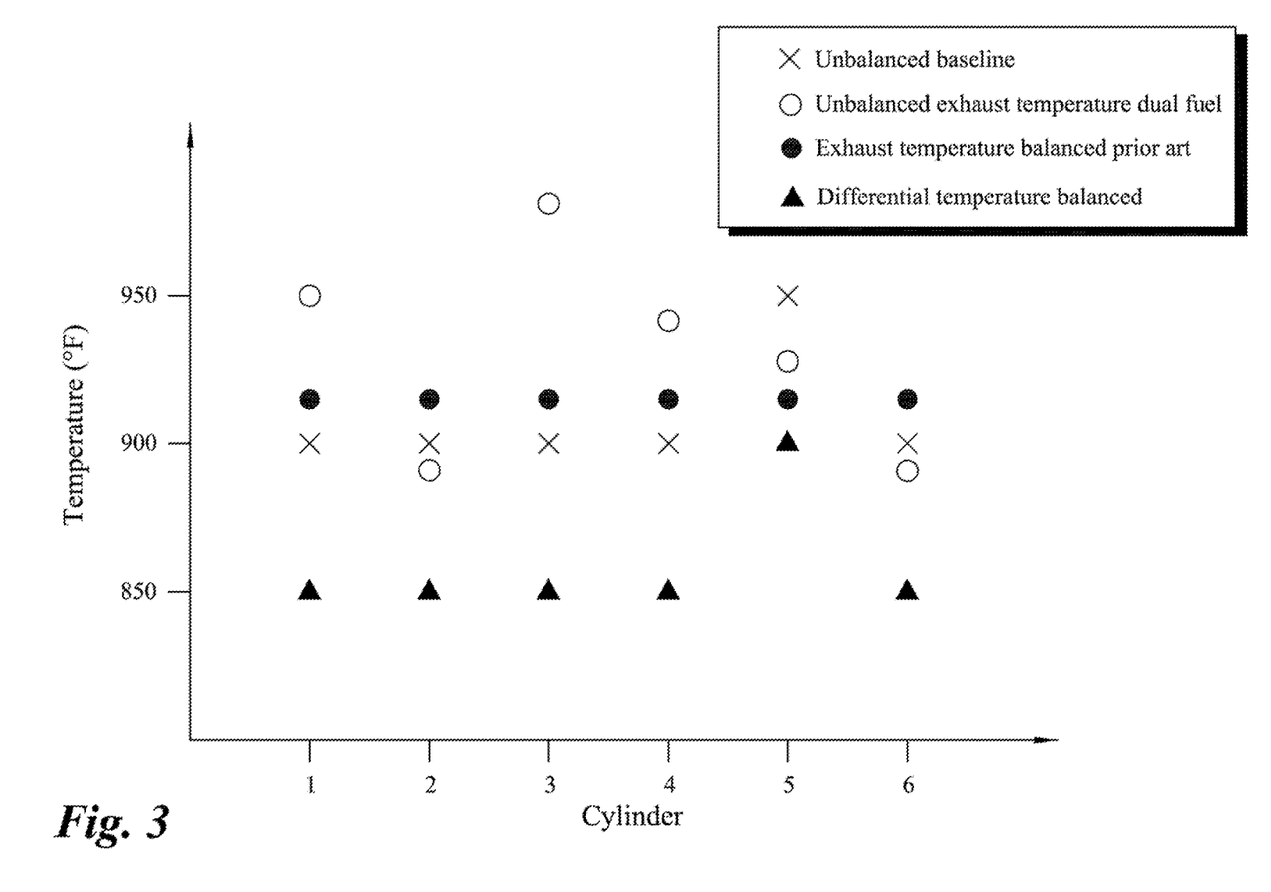
FIG. 3 is an X-Y graph depicting cylinder-by-cylinder variation of exhaust temperature (° F.) according to an embodiment of the present invention.
Figure 4:
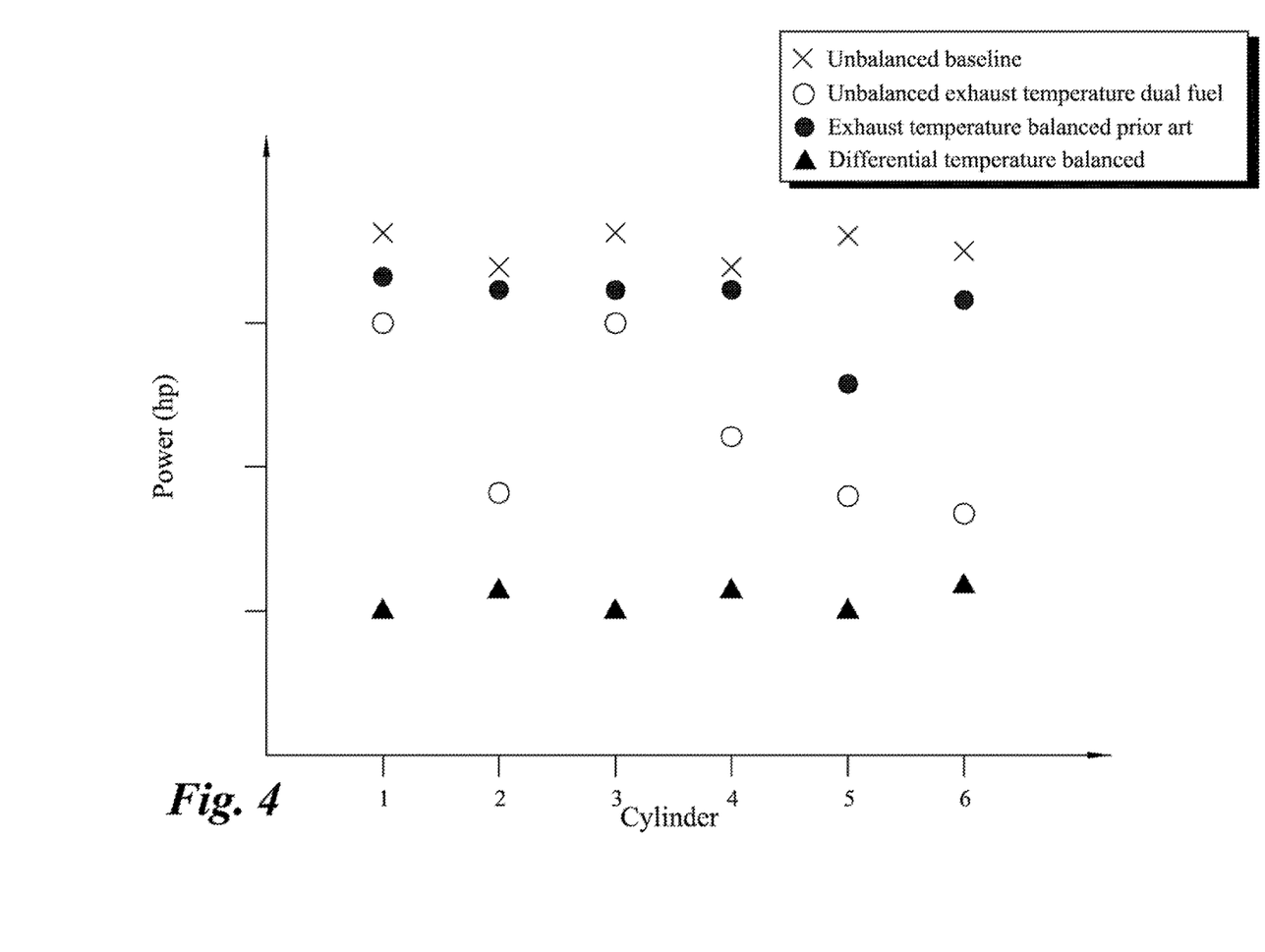
FIG. 4 is an X-Y graph depicting cylinder-by-cylinder variation of power (hp) according to an embodiment of the present invention.

Referring collectively to both FIG. 3 and FIG. 4, depicted are X-Y graphs of the cylinder-by-cylinder variation of exhaust temperature (° F.) and power (hp), respectively, according to an exemplary embodiment such as that shown in FIG. 1. The y-axis is the exhaust temperature (° F.) in FIG. 3; and, resultant power (hp) in FIG. 4. The x-axis the respective cylinder in both figures (in this embodiment: a six-cylinder engine).

Referring to the legend in FIG. 3, the symbol, X, signifies exhaust temperature of the engine 10 (FIG. 1) running in a baseline condition (e.g., diesel only). The symbol, ○, signifies exhaust temperature of the engine 10 (FIG. 1) running in an unbalanced dual fuel mode. The symbol, •, signifies exhaust temperature of the engine 10 (FIG. 1) running in dual fuel mode in a mode that balances exhaust temperatures to be equal for all cylinders (i.e., the current state of the art). The symbol, ▲, signifies exhaust temperature of the engine 10 (FIG. 1) running in dual fuel mode in a mode that is balanced to match the diesel or baseline exhaust temperature profile, in accordance with an embodiment of the invention Similarly, the legend in FIG. 4 uses the same symbols, but instead showing the power output of each cylinder. That is, the symbol, X, signifies power of the engine 10 (FIG. 1) running in a baseline condition (e.g., only on diesel). The symbol, ○, signifies power of the engine 10 (FIG. 1) running in an unbalanced dual fuel mode. The symbol, •, signifies power of the engine 10 (FIG. 1) running in dual fuel mode in a mode that balances exhaust temperatures to be equal for all cylinders (i.e., the current state of the art). Finally, the symbol, ▲, signifies power of the engine 10 (FIG. 1) running in dual fuel mode in a mode that is balance to match the diesel baseline exhaust temperature profile, in accordance with an embodiment of the invention.

As shown, the resultant exhaust temperatures of the cylinders under the present invention more closely match the exhaust temperature profile under the baseline and the resultant power has been found to be more uniform between cylinders.

Figure 5:
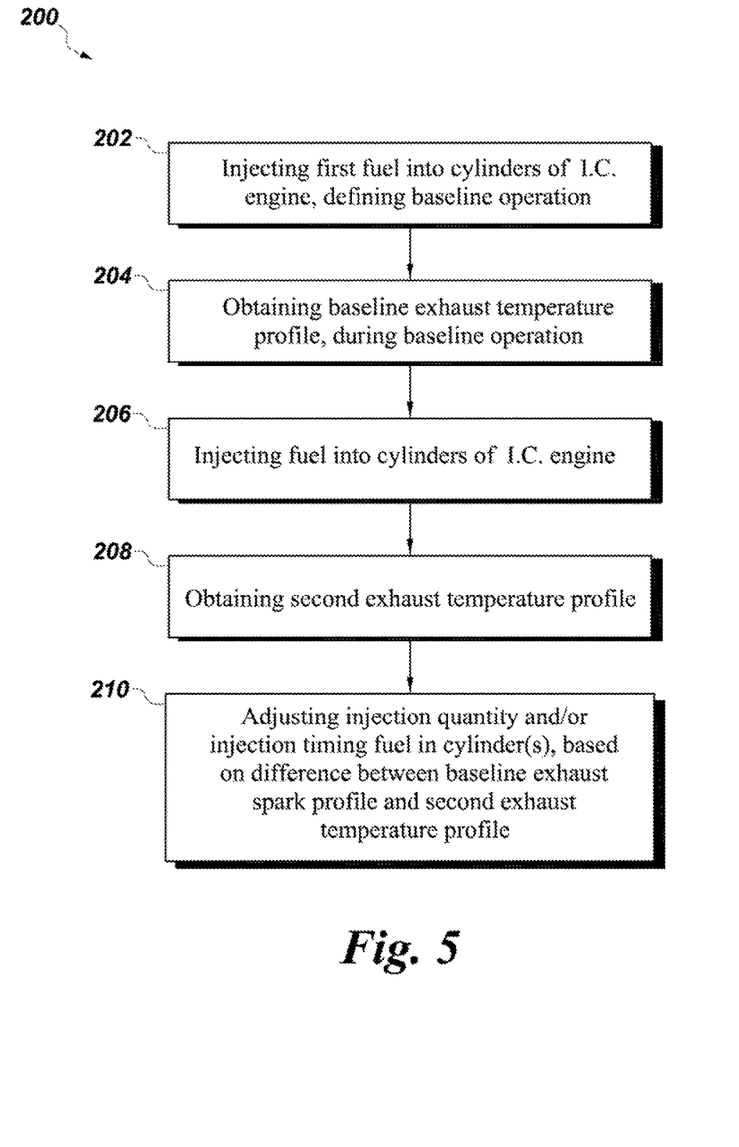
FIG. 5 is a flowchart depicting a method of adjusting operation of an internal combustion engine, according to another embodiment of the present invention.

Referring to FIG. 5, a flowchart of another method of operating the engine 10 is depicted. As shown, this method 200, which could also apply to a single fuel engine, comprises injecting a fuel into a plurality of cylinders of the internal combustion, thereby defining a baseline operation at 202. At 204, the method 200 continues with obtaining a baseline exhaust temperature profile, during the baseline operation. At 206, the method 200 injects the fuel into the cylinders of the engine 10. The method 200 then, at 208, obtains a second exhaust temperature profile during the operation occurring 206. At 210, the method 210 adjusts the fuel injection quantity and/or spark timing of the fuel in one, or more, cylinder based on the difference between the baseline exhaust temperature profile and the second exhaust temperature profile.

The development of obtaining the second exhaust temperature profile 208 may be after an event. For example, the event could be one of a maintenance event, a diagnostic event, and a factory calibration. In an embodiment, the factory calibration or maintenance event could be performed using additional measurement and/or diagnostic equipment that is not integrated into the engine itself. In an embodiment, the diagnostic event could include conducting an event where the engine is run in a condition that is known, for that particular engine, to have relatively low variation between cylinder power and/or exhaust temperature (e.g., single fuel engines often have lower cylinder variations when run at full power). In an embodiment, the newly obtained second exhaust temperature profile may actually supplant the baseline exhaust temperature profile as a 'new' baseline exhaust temperature profile. Some examples of the type of events that might serve in this capacity could be fuel injector replacement, exhaust temperature sensor(s) replacement, engine overall, and the like.

While the embodiments illustrated and described herein may be used with a multi-cylinder internal combustion engine 10 as that depicted in FIG. 1, other configurations may be used. For example, other quantities of cylinders and/or configurations of cylinder banks can be used. Similarly, other fuel configurations other than dual fuel (engines running on single fuels including, for example, diesel, gasoline, or natural gas) can be used.

Therefore, according to one embodiment of the present invention, a method of adjusting operation of an internal combustion engine, the method comprises: injecting a first fuel into a plurality of cylinders of the internal combustion engine, thereby defining a first fuel operation; obtaining a first fuel exhaust temperature profile, during the first fuel operation; injecting a second fuel and the first fuel into the plurality of cylinders of the internal combustion engine, thereby defining a dual fuel operation; obtaining a dual fuel exhaust temperature profile, during the dual fuel operation; and adjusting one of an injection quantity and an injection timing of one of the first fuel and the second fuel in at least one of the plurality of cylinders, based on a difference between the first fuel exhaust temperature profile and the dual fuel exhaust temperature profile.

In accordance with another embodiment of the invention, a method of adjusting operating an internal combustion engine comprises: injecting a fuel into a plurality of cylinders of an internal combustion engine, defining a baseline operation; obtaining a baseline exhaust temperature profile, during the baseline operation; injecting the fuel into the plurality of cylinders; obtaining a second exhaust temperature profile; and adjusting one of an injection quantity and a spark timing of the fuel in at least one of the plurality of cylinders, based on a difference between the baseline exhaust temperature profile and the second exhaust temperature profile.

In accordance with another aspect of the invention, a method of adjusting operation of an internal combustion engine, the method comprises: injecting a first fuel into a plurality of cylinders of the internal combustion engine, thereby defining a first fuel operation; obtaining a first fuel engine operating profile, during the first fuel operation; injecting a second fuel and the first fuel into the plurality of cylinders of the internal combustion engine, thereby defining a dual fuel engine operating profile, during the dual fuel operation; and adjusting one of an injection quantity and an injection timing of one of the first fuel and the second fuel in at least one of the plurality of cylinders, based on a difference between the first fuel engine operating profile and the dual fuel engine operating profile.

In accordance with another aspect of the invention, a method of operating an internal combustion engine comprises: injecting a fuel into a plurality of cylinders of an internal combustion engine, defining a baseline operation; obtaining a baseline engine operating profile, during the baseline operation; injecting the fuel into the plurality of cylinders defining an operating condition other than the baseline operating condition; obtaining a second engine operating profile; and adjusting one of an injection quantity and a spark timing of the fuel in at least one of the plurality of cylinders, based on a difference between the baseline engine operating profile and the second engine operating profile.

The present invention has been described in terms of the preferred embodiment, and it is recognized that equivalents, alternatives, and modifications, aside from those expressly stated, are possible and within the scope of the appending claims.

What is claimed is:

1. A method of adjusting operation of an internal combustion engine, the method comprising:
    injecting a first fuel into a plurality of cylinders of the internal combustion engine, thereby defining a first fuel operation;
    obtaining a first exhaust temperature for each of the plurality of cylinders during the first fuel operation;
    injecting a second fuel and the first fuel into the plurality of cylinders of the internal combustion engine, thereby defining a dual fuel operation;
    obtaining a second exhaust temperature for each of the plurality of cylinders during the dual fuel operation; and
    adjusting one of an injection quantity and an injection timing of one of the first fuel and the second fuel in at least one of the plurality of cylinders, such that a difference between each of the second exhaust temperatures of the plurality of cylinders and a first mean during the dual fuel operation is the same as a difference between each of the first exhaust temperatures of the plurality of cylinders and a second mean during the first fuel operation, respectively, wherein the first mean is a mean of two or more cylinder exhaust temperatures measured during the dual fuel operation and the second mean is a mean of two or more cylinder exhaust temperatures measured during the first fuel operation.

2. The method of claim 1, wherein the first fuel comprises diesel.

3. The method of claim 1, wherein the second fuel comprises natural gas.

4. The method of claim 1, wherein obtaining the first exhaust temperature of each of the plurality of cylinders is in response to at least one of a maintenance event, a diagnostic event, and a factory calibration.

5. The method of claim 1, wherein obtaining the second exhaust temperature of each of the plurality of cylinders is in response to at least one of a maintenance event, a diagnostic event, and a factory calibration.

6. The method of claim 1, further comprising:
    obtaining a first fuel engine operating profile of one or more operating parameters other than the first exhaust temperature of each of the plurality of cylinders during the first fuel operation; and
    obtaining a dual fuel engine operating profile of one or more operating parameters other than the second exhaust temperature of each of the plurality of cylinders during the dual fuel operation;
    wherein the adjusting is further based on a difference between the first fuel engine operating profile and the dual fuel engine operating profile.

7. The method of claim 6, wherein the obtaining the first fuel engine operating profile and the dual fuel engine operating profile is by at least one of a knock sensor, a pressure sensor, and a stress/strain gage.

8. A method of operating an internal combustion engine comprising:
    injecting a fuel into a plurality of cylinders of the internal combustion engine, defining a baseline operating condition;
    obtaining a first exhaust temperature of each of the plurality of cylinders during the baseline operation;
    injecting the fuel into the plurality of cylinders, defining a second operating condition other than the baseline operating condition;
    obtaining a second exhaust temperature of each of the plurality of cylinders during the second operating condition; and
    adjusting one of an injection quantity and a spark timing of the fuel in at least one of the plurality of cylinders such that a difference between each of the second exhaust temperatures of the plurality of cylinders and a first mean during the second operating condition is the same as a difference between each of the first exhaust temperatures of the plurality of cylinders and a second mean during the baseline operating condition, respectively, wherein the first mean is a mean of two or more cylinder exhaust temperatures measured during the second operating condition and the second mean is a mean of two or more cylinder exhaust temperatures measured during the baseline operating condition.

9. The method of claim 8, further comprising obtaining a third exhaust temperature of each of the plurality of cylinders after an event.

10. The method of claim 9, wherein the event comprises one of a maintenance event, a diagnostic event, and a factory calibration.

11. The method of claim 10, wherein the factory calibration or the maintenance event is performed using additional measurement and diagnostic equipment that is non-integrated with the internal combustion engine.

12. The method of claim 9, further comprising replacing the first exhaust temperature of each of the plurality of cylinders with the third exhaust temperature of each of the plurality of cylinders.

13. The method of claim 8, further comprising:
    obtaining a baseline engine operating profile of one or more operating parameters other than the first exhaust temperature of each of the plurality of cylinders during the baseline operation; and
    obtaining a second engine operating profile of one or more operating parameters other than the second exhaust temperature of each of the plurality of cylinders after an event;

wherein the adjusting is further based on a difference between the baseline engine operating profile and the second engine operating profile.

14. A method of adjusting operation of an internal combustion engine, the method comprising:
injecting a first fuel into a plurality of cylinders of the internal combustion engine, thereby defining a first fuel operation;
obtaining a respective first exhaust temperature of each of the plurality of cylinders during the first fuel operation;
injecting a second fuel and the first fuel into the plurality of cylinders of the internal combustion engine, thereby defining a dual fuel operation;
obtaining a respective second exhaust temperature for each of the plurality of cylinders during the dual fuel operation; and
adjusting an injection quantity and/or an injection timing of one of the first fuel and the second fuel in at least one of the plurality of cylinders, such that a difference between each of the second exhaust temperatures of the plurality of cylinders and a first mean during the dual fuel operation is the same as a difference between each of the first exhaust temperatures of the plurality of cylinders and a second mean during the first fuel operation, respectively, wherein the first mean is a mean of two or more cylinder exhaust temperatures measured during the dual fuel operation and the second mean is a mean of two or more cylinder exhaust temperatures measured during the first fuel operation.

15. A method of operating an internal combustion engine comprising:
injecting a fuel into a plurality of cylinders of an internal combustion engine, defining a baseline operating condition;
obtaining a respective first exhaust temperature of each of the plurality of cylinders during the baseline operation;
injecting the fuel into the plurality of cylinders, defining a second operating condition other than the baseline operating condition;
obtaining a respective second exhaust temperature of each of the plurality of cylinders during the second operating condition; and
adjusting an injection quantity and/or a spark timing of the fuel in at least one of the plurality of cylinders, such that a difference between each of the respective second exhaust temperatures of the plurality of cylinders and a first mean during the second operating condition is the same as a difference between each of the respective first exhaust temperatures of the plurality of cylinders and a second mean during the baseline operating condition, wherein the first mean is a mean of two or more cylinder exhaust temperatures measured during the second operating condition and the second mean is a mean of two or more cylinder exhaust temperatures measured during the baseline operating condition.

* * * * *